United States Patent [19]
Koh et al.

[11] Patent Number: 5,508,782
[45] Date of Patent: Apr. 16, 1996

[54] LIGHTING UNIT COOLING DEVICE CONTROL AND COMBINED EXHAUST DEVICE

[75] Inventors: Shokyo Koh, Yokohama; Yoshihiko Suzuki, Tokyo; Satoshi Mori, Yokohama; Koki Kuroda, Tokyo, all of Japan

[73] Assignee: Canon Kabushiki Kaisha, Tokyo, Japan

[21] Appl. No.: 336,759

[22] Filed: Nov. 8, 1994

Related U.S. Application Data

[63] Continuation of Ser. No. 64,351, May 20, 1993, abandoned, which is a continuation of Ser. No. 655,803, Feb. 15, 1991, abandoned.

[30] Foreign Application Priority Data

Feb. 17, 1990 [JP] Japan ......................... 2-36715

[51] Int. Cl.⁶ .................................................. G03G 21/00
[52] U.S. Cl. .......................... 355/30; 315/117; 315/309; 355/215; 355/229
[58] Field of Search .............................. 355/30, 69, 71, 355/214, 215, 229; 362/294; 315/117, 309, 151

[56] References Cited

U.S. PATENT DOCUMENTS

| | | | |
|---|---|---|---|
| 3,330,180 | 7/1967 | Ferguson et al. | 88/24 |
| 4,518,895 | 5/1985 | Lehman | 315/117 |
| 4,533,853 | 8/1985 | Hammond et al. | 315/151 X |
| 4,533,854 | 8/1985 | Northrup | 315/151 X |
| 4,720,727 | 1/1988 | Yoshida | 219/216 X |
| 4,870,454 | 9/1989 | Kurusu et al. | 355/229 X |
| 4,887,122 | 12/1989 | Morikawa | 355/30 |
| 4,903,072 | 2/1990 | Iwata | 355/30 |
| 4,952,986 | 8/1990 | Maeda et al. | 355/214 |
| 4,978,890 | 12/1990 | Sekiguchi et al. | 315/117 |
| 5,150,154 | 9/1992 | Kuwabara | 355/299 X |

FOREIGN PATENT DOCUMENTS

| | | | |
|---|---|---|---|
| 0316010 | 5/1989 | European Pat. Off. | |
| 0615969 | 12/1988 | France . | |
| 0123564 | 9/1981 | Japan | 355/229 |
| 0078176 | 5/1983 | Japan | 355/229 |
| 0153955 | 9/1983 | Japan . | |
| 0188557 | 8/1986 | Japan . | |

*Primary Examiner*—Benjamin R. Fuller
*Assistant Examiner*—John E. Barlow, Jr.
*Attorney, Agent, or Firm*—Fitzpatrick, Cella, Harper & Scinto

[57] ABSTRACT

An image formation apparatus comprises an image formation device for forming an image on a recording material according to image information light obtained from light emitted from a light source. A detector detects the light intensity emitted from the light source. A single cooling fan is provided for cooling both the light source and the image formation device. The drive force of the cooling fan is set at either a first value or a second value. The driving force is set at the first value during a time period from a start of energization of the light source until the light intensity detected by the detector is at least the predetermined value. The driving force is set at the second value after the detected light intensity is at least the predetermined value. The first value of the driving force is less than that of the second value.

20 Claims, 6 Drawing Sheets

LIGHTING UNIT COOLING DEVICE CONTROL AND COMBINED EXHAUST DEVICE

This application is a continuation of application Ser. No. 08/064,351 filed May 20, 1993, abandoned, which is a continuation of application Ser. No. 07/655,803 filed Feb. 15, 1991, now abandoned.

BACKGROUND OF THE INVENTION

1. Field of the Invention

The present invention relates to a lighting unit equipped with a cooling means for cooling a light source, and an image formation apparatus having it.

2. Related Background Art

In a prior copying apparatus, a photosensitive body is charged uniformly by a charger, then exposed with image light according to an original image emitted from a light source. After passing the processes of development and transferring onto a recording material, developer is heated and fused onto the recording material by a heat fusing unit, and finally, a copy product is obtained. This kind of an apparatus is provided with a fan or a fanning or cooling means for air exhaust, because the charger generates ozone when charging the photosensitive body. To inhibit an abnormal temperature rise of the light source or prevent the heat fusing unit from raising the temperature inside of the apparatus abnormally, a heat exhaust fan is also incorporated in the apparatus.

When the main unit of the apparatus is energized, the fans are driven at a certain rotational speed. For a compact apparatus, in particular, a fan for air and heat exhaust is used to for the limited space. This kind of a fan is driven at a certain rotational speed all the time while the main unit is being energized.

A fluorescent lamp or other illumination lamp is characterized by the fact that the light amount varies with the bulb surface temperature. In the aforesaid prior apparatus, the illumination lamp is cooled by the fan which is driven after the start of energizing the main unit. This brings about such a disadvantage as to prolong the duration from the start of energizing the illumination lamp until the lamp emits a required amount of light (This is especially noticeable under a low-temperature environment). Therefore, supposing a copy operation is started before the required amount of light is obtained, the starting portion of an image may become abnormally dense.

Thus, using the aforesaid prior apparatus, to start an copy operation when an original illumination lamp emits a required amount of light and thereby obtain an satisfactory image, the startup time must be greatly extended. As a result, the copy operation becomes time-consuming.

SUMMARY OF THE INVENTION

An object of the present invention is to provide a lighting unit which helps minimize the startup of a light source.

Other object of the invention is to provide an image formation apparatus which forms a satisfactory image and minimizes the time required for image formation.

Other object of the invention is to provide an image formation apparatus which controls the drive of a cooling means according to the light amount of a light source.

Other object of the invention is to provide an image formation apparatus which controls the drive of a cooling means which cools a light source according to the temperature inside of the apparatus.

Other object of the invention is to provide an image formation apparatus which eliminates the influence of ozone generated from a charging means and hastens the rising of a light source.

The other objects of the invention will be apparent with the description below.

DETAILED DESCRIPTION OF THE PREFERRED EMBODIMENTS

Embodiments of the invention are described below in conjunction with the drawings.

Figure 1:
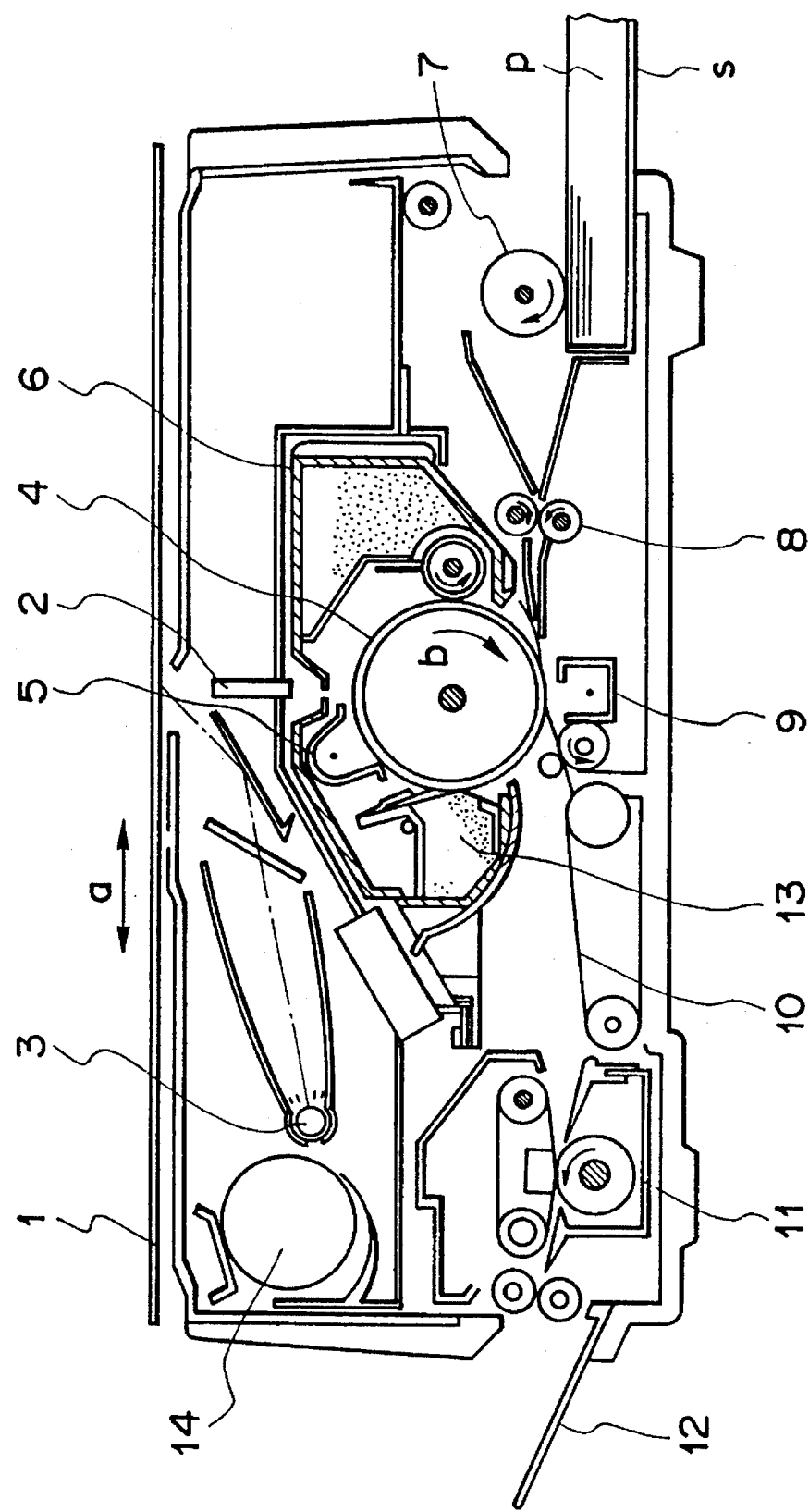
FIG. 1 shows a cross section of a copy apparatus to which an embodiment of the invention is applicable.

FIG. 1 shows a substantial cross section of a copy apparatus or an image formation apparatus to which the first embodiment of the invention is applied.

In FIG. 1, 1 represents an original base made of glass or other transparent member. The original base 1 reciprocates in an a-arrow direction to scan an original. A short-focus small-diameter image-formation element array 2 is arranged immediately under the original base 1. An original placed on the original base 1 is illuminated by a fluorescent lamp 3 or an illumination lamp. A reflecting mirror image of the original is slit-exposed on a photosensitive drum 4 rotating in b-arrow direction by the array 2.

Reference numeral 5 is a charger, and it uniformly charges the photosensitive drum 4. The photosensitive drum is covered with a zinc oxide photosensitive layer or an organic semi-conducting photosensitive layer. The drum 4, charged uniformly by the charger 5, is exposed by the array 2 to form an electrostatic latent image. The electrostatic latent image is made visible by a developing unit 6 using powdered toner which is softened and fused with heat.

On the other hand, a sheet P stored in a cassette S is fed onto the drum by a pair of transportation rollers 8 which are compressed vertically and rotated in a certain time after a feed roller 7 to synchronize with the formation of an image on the photosensitive drum 4. Then, a transfer discharger 9 transfers a toner image formed on the photosensitive drum 4 onto the sheet P.

Then, a well-known separation means separates the sheet P from the drum 4. The sheet P is led to a heat fusing unit 11 by a transportation guide 10, heated and fused, and finally discharged onto a tray 12. After the toner image is transferred, the residual toner on the drum 4 is removed by a cleaner 13.

An image formation means described in this embodiment forms an image on a recording material according to image information light obtained by illuminating an original. Specifically, it includes a process means in the vicinity of a drum 4 and a heat fusing unit which heats and fuses an image onto the recording material.

Reference numeral 14 is a single air and heat exhaust fan, which is normally driven when the main switch of a copy apparatus is turned ON. Single fan 14 is located above the fusing unit 11, and cools a fluorescent lamp 3 and the fusing unit 11, and discharges ozone generated from a charger 5 out of the apparatus. Thus, the fan inhibits the abnormal temperature rise of the fluorescent lamp 3 and prevents the fusing unit 11 from raising the internal temperature of the apparatus abnormally.

Figure 2:
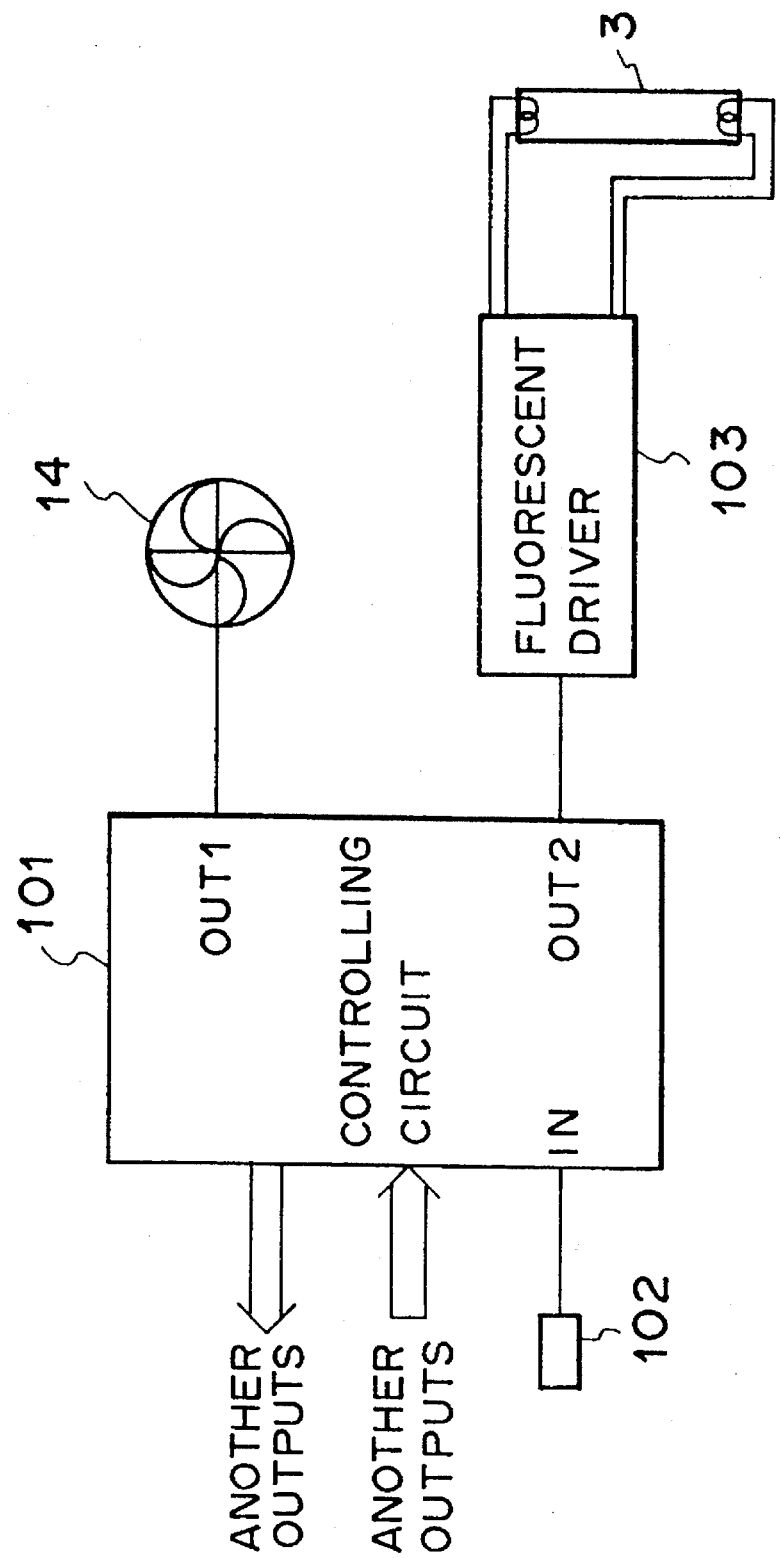
FIG. 2 is a block diagram for explaining the first embodiment of the invention.

FIG. 2 is a block diagram for explaining electric control around a lighting unit shown in FIG. 1. Reference numeral 101 is a controlling circuit equipped with microcomputers. The input terminal IN is connected to a light intensity sensor 102 which detects the light amount of a fluorescent lamp. The output terminals OUT 1 and OUT 2 are connected to a fan 14 and a fluorescent lamp driver 103 respectively. The terminal controls the fan 14 to rotate or stop, preheats or lights the fluorescent lamp by energizing it, or controls the light intensity thereof. Other input and output signals (not illustrated) are transferred to activate the copy operation of a copy apparatus of this embodiment. The controlling circuit 101 incorporates ROM and RAM in which the copy operation sequence program for the copy apparatus and other programs are written.

Figure 3:
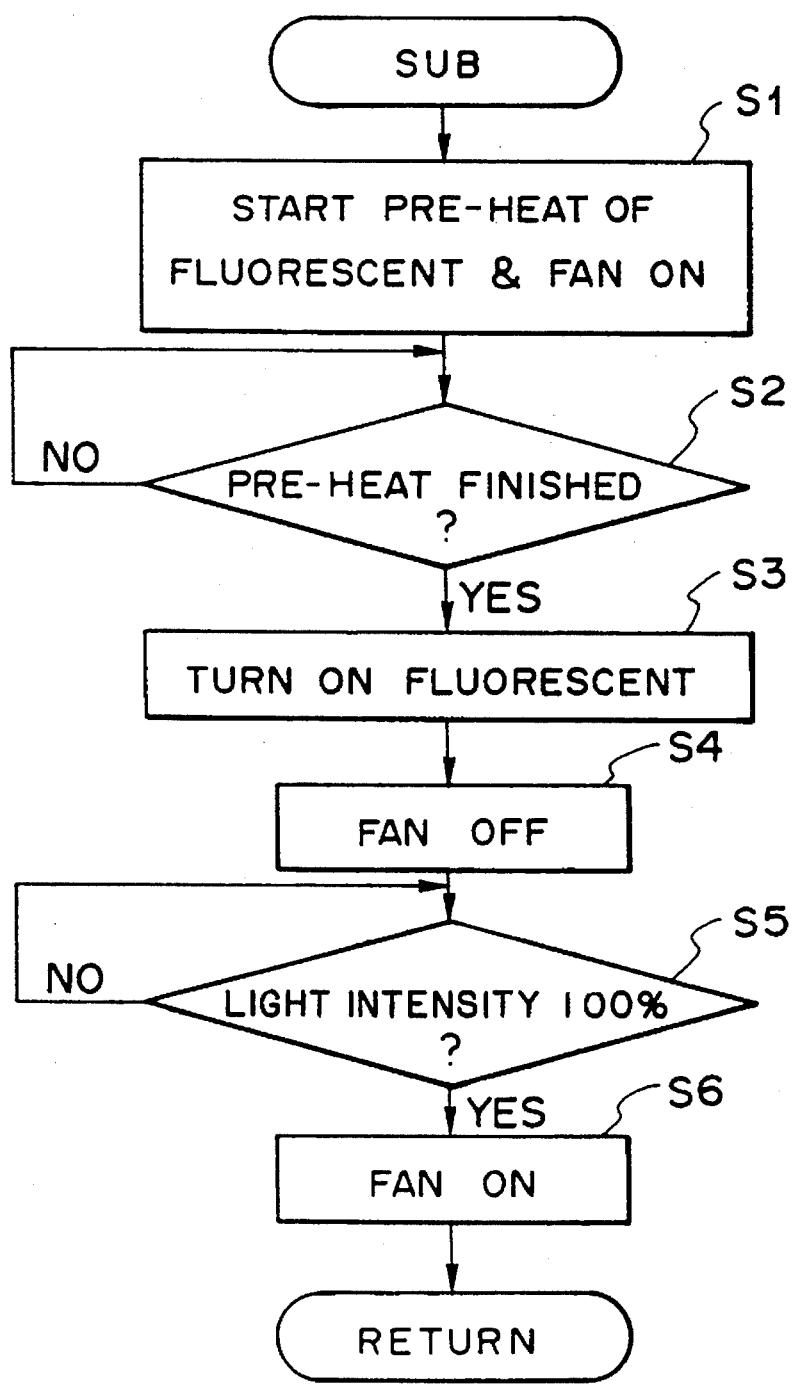
FIG. 3 is a flowchart for explaining the first embodiment.
Figure 4:
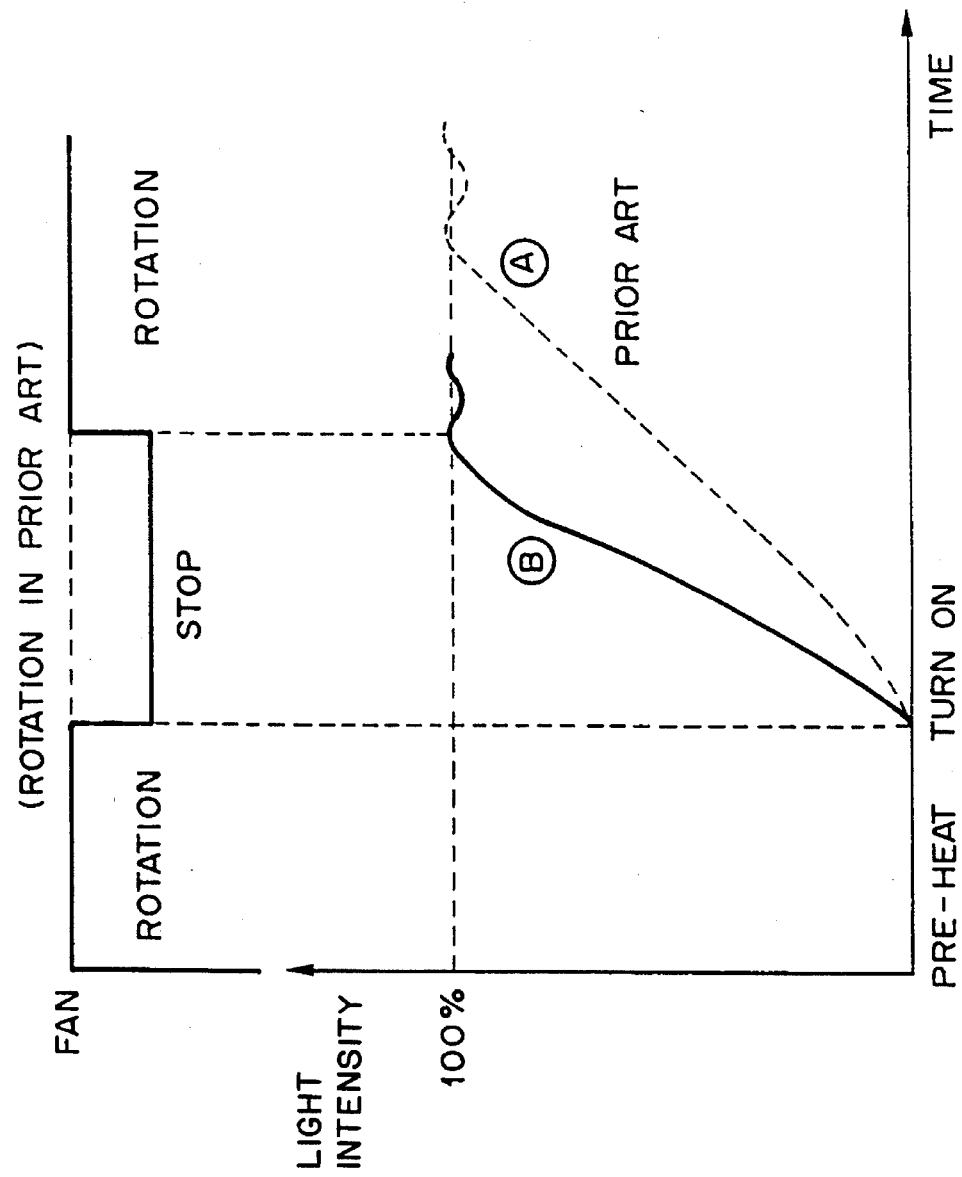
FIG. 4 shows the startup curves of light amounts for the first embodiment and a prior apparatus.

FIG. 3 is a flowchart showing the fluorescent lamp lighting sequence and fan drive control sequence. The flowchart of FIG. 3 represents a subroutine called at the start of a copy operation which is activated with the COPY switch turned ON. First of all, at a step S1, a filament or a well-known means for lighting a fluorescent lamp is energized to start a preheating operation. At this time, a fusing unit which is actuated with the COPY switch turned ON increases the temperature inside of the apparatus. To minimize the temperature rise, a fan is driven. After that, the system waits until the preheating of the fluorescent lamp is completed (step 2). When the preheating is completed, control is passed to the fluorescent lamp so that the fluorescent lamp will be energized to light (step S3). Next, the drive of the fan is inhibited (step S4). Then, the light amount of the fluorescent lamp is detected by a light intensity sensor 102. When the detected value reaches the preset value (step S5), the fan is driven again (step S6). After that, control is returned to a copy operation program. FIG. 4 shows the rising of the light amount of the fluorescent lamp.

In FIG. 4, Ⓐ indicates the rising of the light intensity of a prior fluorescent lamp. Apparently, since the prior fluorescent lamp is cooled by a fan, it takes more time for the light amount to reach 100% of a given value. On the other hand, if a fan is stopped in the manner as devised in this embodiment, the rising curve becomes like Ⓑ. That is to say, the startup time is reduced. The difference between curves Ⓐ and Ⓑ in FIG. 4 is due to a low-temperature caused by the fan. Thus, since a fluorescent lamp is energized and the drive of a fan is inhibited at the rising of a light amount, the fluorescent lamp is not cooled by the fan. Thereby, the rising of the light intensity is speeded up and a copy operation is done quickly.

In the aforesaid embodiment, the drive of a fan is inhibited thus stopping the fan. In this state, it is impossible to exhaust ozone generated from a charger or prevent a heat fusing unit from raising the temperature inside of an apparatus. As far as the driving force for the fan is not so excessive as to cool a fluorescent lamp too much, the fan need not be stopped completely. When the fan driving force during the rising of a light intensity is made smaller than that after the light amount has reached a given value, the same effects as those provided by the aforesaid embodiment are made available. In the aforesaid embodiment, a single fan is used to cool a light source and a heat fusing unit, and exhaust ozone generated from a charging means. A cooling means for exclusive use of cooling the light source may be employed. At the startup of the fluorescent lamp, the cooling means only may be controlled to stop or driven at a lower speed. At this time, the cooling effect of the fan does not extend to the fusing unit. The fan may be stopped at the start of preheating or when a filament is energized.

Next, another embodiment of the invention is described.

In the foregoing first embodiment, the light intensity of a fluorescent lamp is detected to control the drive of a fan. In the second embodiment, a temperature measuring means for measuring the temperature of the fluorescent lamp is further included. Based on the measured temperature, it is determined whether to stop the fan.

Figure 5:
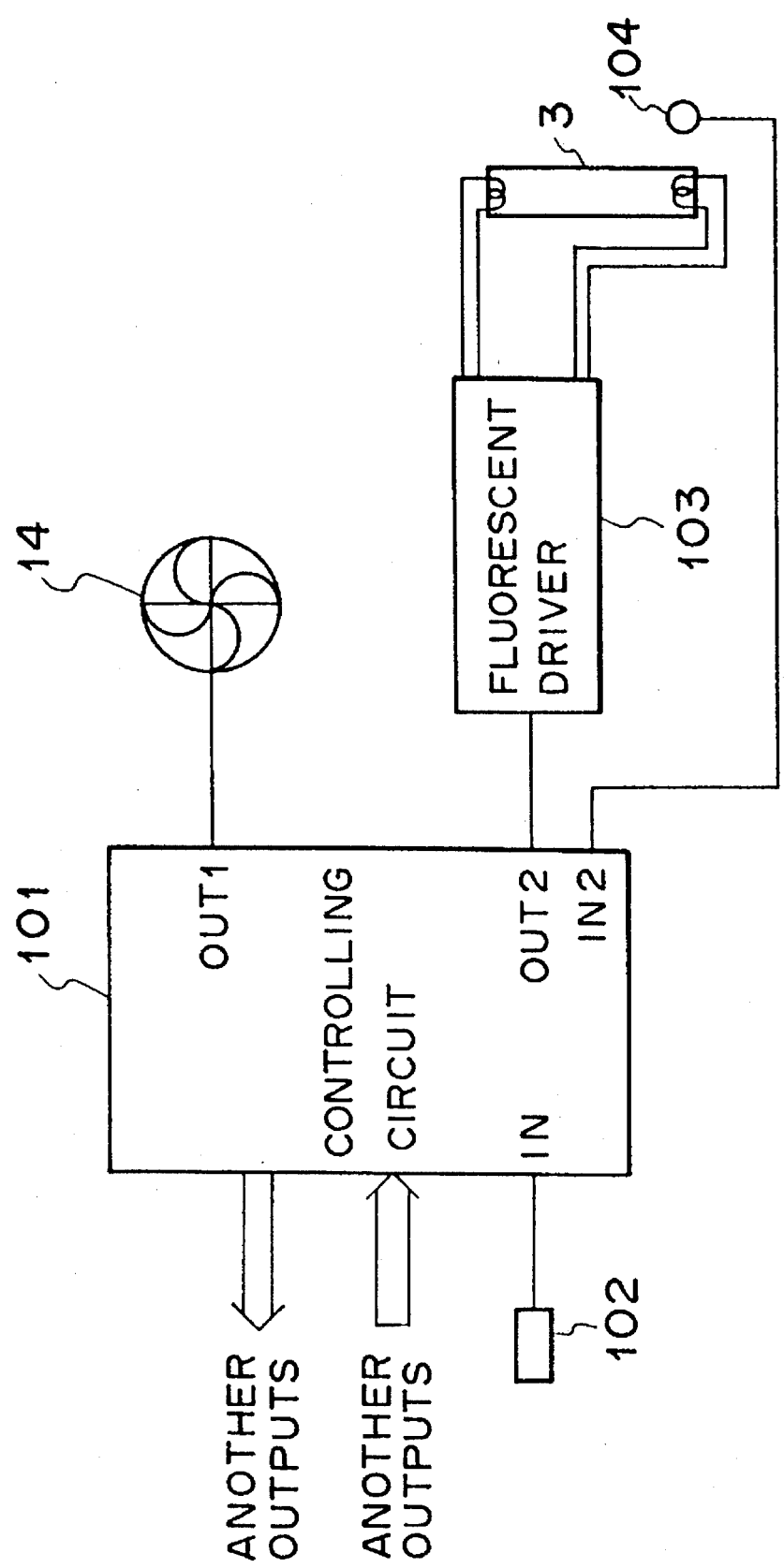
FIG. 5 is a block diagram for explaining the second embodiment of the invention.

FIG. 5 is a block diagram of this embodiment.

A thermistor 104 for measuring the bulb surface temperature of a fluorescent lamp is attached to the fluorescent lamp. The thermistor 104 is connected to IN2 of a controlling circuit 101. The other configuration is identical to that of the first embodiment.

Figure 6:
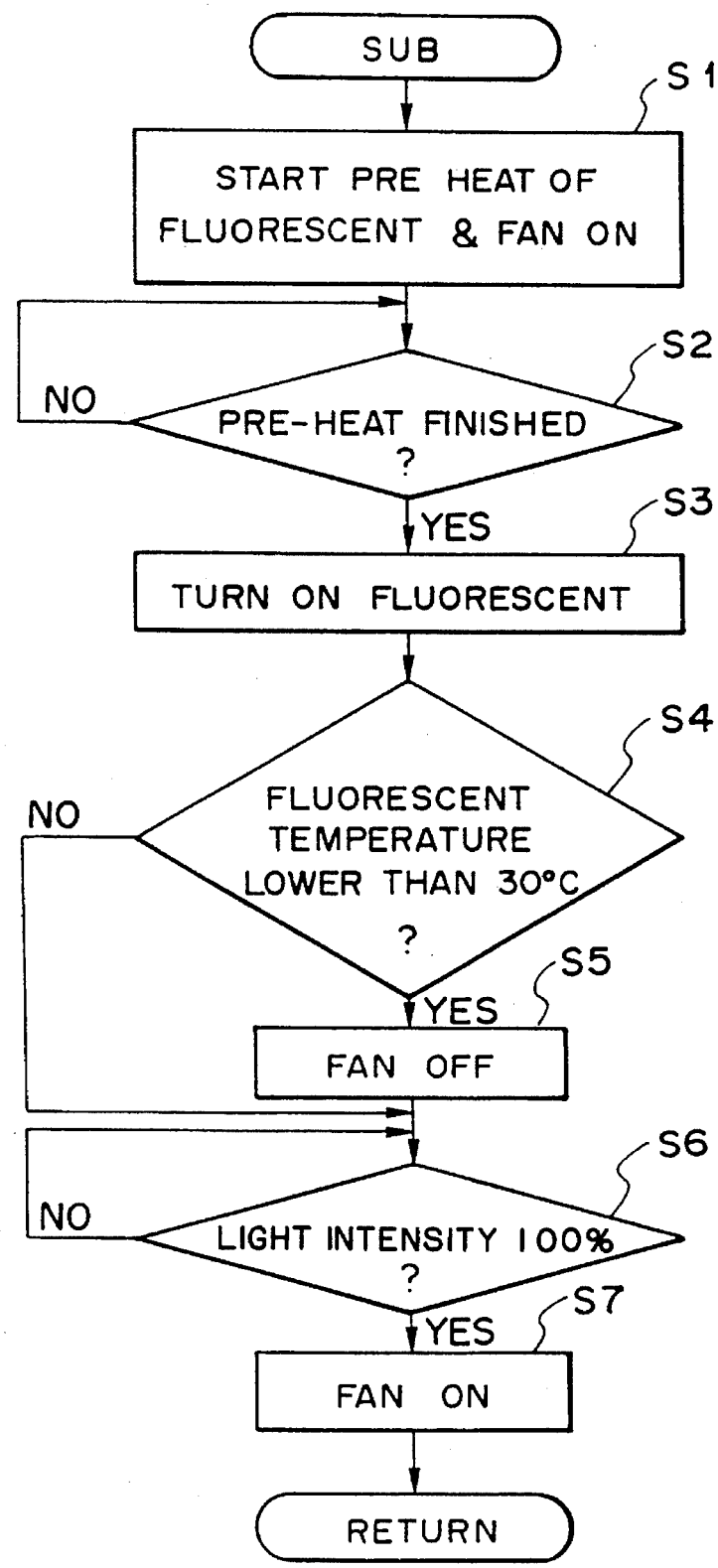
FIG. 6 is a flowchart for explaining the second embodiment.

FIG. 6 is a flowchart showing the operations of this embodiment, which represents a subroutine called at the start of a copy operation of a copy apparatus. At a step S1, a preheating operation is started to light a fluorescent lamp. At this time, a fan is driven to minimize a temperature rise inside of the apparatus derived from the heat of a fusing unit. The system waits until the preheating of the fluorescent lamp completes (step S2) then, the fluorescent lamp is energized to light (step S3). Next, the sequence is passed to a step 4. If the temperature of the fluorescent lamp is lower than a preset value, or for example 30°, control passes to a step S5 to stop the fan. If the temperature exceeds 30°, control advances to a step 6. Then, it is verified that the light intensity has reached a given value (step S6), and then the fan is driven (step S7). Thus, only when the temperature of the fluorescent lamp is lower than a preset value, the drive of the fan is stopped. Compared with the first embodiment in which the drive of the fan is temporarily stopped while the fluorescent lamp is being energized, a copy operation can be speeded up.

In the aforesaid embodiment, the measuring means measures the temperature of the fluorescent lamp. Alternatively, the temperature in the vicinity of the fluorescent lamp or that inside of the copy apparatus may be measured to determine whether the drive of the fan is turned ON or OFF.

Next, a further embodiment of the invention is described.

In the first and second embodiments, the stop period of a fan is determined with the light intensity or temperature of a fluorescent lamp. In the third embodiment, the stop period is determined under other image formation condition.

As described previously, the fan serves as a fanning means to exhaust ozone generated from a charger. In this embodiment, a fluorescent lamp is energized with the COPY switch turned ON. After the drive of the fan is stopped, even if the light intensity of the fluorescent lamp reaches a sufficient value, the drive of the fan remains stopped until charger charges the photosensitive drum or ozone is generated.

In the period from when the fluorescent lamp is energized to start emitting light until the charged area of the photosensitive drum charged by the charger is illuminated with light of the light amount corresponding to an original image, a reflection plate (not illustrated) is used so that the light emitted from the fluorescent lamp will not illuminate the original but reach the photosensitive drum. Thereby, the fluorescent lamp can emit the light at the rising to the photosensitive drum. Thus, the residual electric charges on the photosensitive drum can be eliminated to prevent the surface of the photosensitive drum from becoming electrically uneven.

The light intensity of the fluorescent lamp can be set to be a sufficient value by adjusting the period from when the COPY switch is turned ON until the charger is turned ON.

Thus, in this embodiment, the rotational drive of a fan or a fanning means is stopped until a charger is turned ON. Thereby, the startup of a fluorescent lamp can be speeded up without being affected by ozone.

In the aforesaid third embodiment, the drive of a fan is turned ON with a charger turned ON. Alternatively, an optical sensor may be used to check if the light intensity of a fluorescent lamp is increased to some extent, or reaches 90% of a required amount. Then, a given time later, the drive of the fan may be turned ON with the charger turned ON. Thereby, the influence of ozone can be eliminated and the reliability in the light amount of a fluorescent lamp can be upgraded.

The aforesaid embodiments are related to analog copy machines. The invention is also applicable to a digital copy machine in which a reading unit and a recording unit are set apart, as far as the machine comprises a fanning means which can cool a light source, and perform air exhaust and cooling under other image formation condition.

The embodiments of the invention has been described so far, the invention is not confined to these embodiments. Various deformed embodiments are conceivable within the technological philosophy of the invention.

What is claimed is:

1. An image formation apparatus, comprising:
   a fluorescent lamp for emitting light, said fluorescent lamp preheating upon activation of a copy switch and emitting light after preheating;
   an image formation means for forming an image on a recording material according to image information light obtained from light emitted from the fluorescent lamp;
   a detecting means for detecting light intensity emitted from the fluorescent lamp;
   a cooling means for cooling both said fluorescent lamp and said image formation means; and
   a driving means for driving said cooling means, said driving means capable of driving the cooling means with a first driving force, a second driving force smaller than the first driving force and a third driving force larger than the second driving force;
   wherein said driving means drives said cooling means with the first driving force until the preheating of said fluorescent lamp is completed,
   thereafter stops driving or drives said cooling means with the second driving force, the driving being stopped or driven with the second driving force during a period from a start of light emission by the fluorescent lamp until the light intensity detected by the detecting means reaches a predetermined value, and
   thereafter drives said cooling means with the third driving force upon detection of light intensity reaching the predetermined value.

2. An image formation apparatus according to claim 1, wherein said image formation means comprises a heat fusing means for heating and fusing toner on the recording material, and wherein said single cooling means cools said heat fusing means.

3. An image formation apparatus according to claim 1, wherein the driving force of said driving means is set to the third value during a time period when said image formation means forms the image.

4. An image formation apparatus according to claim 1, wherein image information light obtained from the light emitted from said light source is the light obtained when said light source emits light to illuminate an original.

5. An image formation apparatus according to claim 1, wherein said cooling means comprises a rotatable fan.

6. An image formation apparatus, comprising:
   a fluorescent lamp for emitting light, said fluorescent lamp preheating upon activation of a copy switch and emitting light after preheating;
   an image formation means for forming an image on a recording material according to image information light obtained from light emitted from the fluorescent lamp;
   a detecting means for detecting light intensity emitted from the fluorescent lamp;
   a fanning means for cooling said fluorescent lamp and for exhausting from said image formation means; and
   a driving means for driving said fanning means, said driving means capable of driving the fanning means with a first driving force, a second driving force smaller than the first driving force and a third driving force larger than the second driving force;
   wherein said driving means drives said fanning means with the first driving force until the preheating of said fluorescent lamp is completed,
   thereafter stops driving or drives said fanning means with the second driving force, the driving being stopped or driven with the second driving force during a period from a start of light emission by the fluorescent lamp until the light intensity detected by the detecting means reaches a predetermined value, and
   thereafter drives said fanning means with the third driving force upon detection of light intensity reaching the predetermined value.

7. An image formation apparatus according to claim 6, wherein said image formation means comprises a charging means for charging a photosensitive body, and wherein said fanning means exhausts ozone generated from said charging means.

8. An image formation apparatus according to claim 6, wherein the driving force of said driving means is set at the third value during a time period when said image formation means is forming an image.

9. An image formation apparatus according to claim 6, wherein image information light obtained from the light emitted from said light source is the light obtained when said light source emits light to illuminate an original.

10. An image formation apparatus according to claim 6, wherein said fanning means comprises a rotatable fan.

11. An image formation apparatus, comprising:
    a fluorescent lamp for emitting light, said fluorescent lamp preheating upon activation of a copy switch and emitting light after preheating;

an image formation means for forming an image on a recording material according to image information light obtained from light emitted from the fluorescent lamp;

a detecting means for detecting an internal temperature of the image formation apparatus;

a cooling means for cooling both said fluorescent lamp and said image formation means; and a driving means for driving said cooling means, said driving means capable of driving the cooling means with a first driving force, a second driving force smaller than the first driving force and a third driving force larger than the second driving force;

wherein said driving means drives said cooling means with the first driving force until the preheating of said fluorescent lamp is completed, thereafter stops driving or drives said cooling means with the second driving force, the driving being stopped or driven with the second driving force during a period from a start of light emission by the fluorescent lamp until the internal temperature detected by the detecting means reaches a predetermined value, and thereafter drives said cooling means with the third driving force upon detection of internal temperature reaching the predetermined value.

12. An image formation apparatus according to claim 11, wherein said image formation means comprises a heat fusing means for heating and fusing toner on a recording material, and wherein said cooling means cools said heat fusing means.

13. An image formation apparatus according to claim 11, wherein said detecting means detects the temperature of said light source.

14. An image formation apparatus, comprising:

a fluorescent lamp for emitting light, said fluorescent lamp preheating upon activation of a copy switch and emitting light after preheating;

an image formation means for forming an image on a recording material according to image information light obtained from light emitted from the fluorescent lamp;

a detecting means for detecting an internal temperature of the image formation apparatus;

a fanning means for cooling said fluorescent lamp and exhausting from said image forming means; and a driving means for driving said fanning means, said driving means capable of driving the fanning means with a first driving force, a second driving force smaller than the first driving force and a third driving force larger than the second driving force;

wherein the driving means drives said fanning means with the first driving force until the preheating of said fluorescent lamp is completed, thereafter stops driving or drives said fanning means with the second driving force, the driving being stopped or driven with the second driving force during a period from a start of light emission by the fluorescent lamp until the internal temperature detected by the detecting means reaches a predetermined value, and thereafter drives said fanning means with the third driving force upon detection of internal temperature reaching the predetermined value.

15. An image formation apparatus according the claim 14, wherein said image formation means comprises a charging means for charging a photosensitive drum, and wherein said fanning means exhausts ozone generated from said charging means.

16. An image formation apparatus according to claim 14, wherein said detecting means detects the temperature of said light source.

17. An image formation apparatus, comprising:

a photosensitive body;

a fluorescent lamp for emitting light, said fluorescent lamp preheating upon activation of a copy switch and emitting light after preheating;

a charging means for charging said photosensitive body;

a fanning means for cooling said fluorescent lamp and for exhausting from said charging means; and a driving means for driving said fanning means;

wherein said drive means is stopped during a time period from a light emitting of said fluorescent lamp to commencing of charging said charging means.

18. An image formation apparatus according to claim 17, further comprising an image formation means for forming an image on a recording material according to image information light obtained from the light emitted from said light source, wherein said light source is energized with the start of an image formation operation by said image formation means.

19. An image formation apparatus according to claim 17, wherein said fanning means exhausts ozone generated from said charging means.

20. An image formation apparatus according to claim 17, wherein said fanning means comprises a rotatable fan.

* * * * *

UNITED STATES PATENT AND TRADEMARK OFFICE
CERTIFICATE OF CORRECTION

PATENT NO. : 5,508,782
DATED : April 16, 1996
INVENTOR(S) : SHOKYO KOH, et al.

It is certified that error appears in the above-indentified patent and that said Letters Patent is hereby corrected as shown below:

COLUMN 1

Line 25, "fanning or" should be deleted.
Line 35, "to for" should read --due to--.

COLUMN 2

Line 15, "cross section" should read --cross-section--.
Line 34, "cross section" should read --cross-section--.

COLUMN 3

Line 20, "amount" should read --intensity--.
Line 42, "(step 2)." should read --(Step S2)--.

COLUMN 4

Line 41, "step 6." should read --step S6.--.
Line 59, "condition." should read --conditions.--.

UNITED STATES PATENT AND TRADEMARK OFFICE
CERTIFICATE OF CORRECTION

PATENT NO. : 5,508,782

DATED : April 16, 1996

INVENTOR(S) : SHOKYO KOH, et al.

It is certified that error appears in the above-indentified patent and that said Letters Patent is hereby corrected as shown below:

COLUMN 5

Line 34, "condition." should read --conditions.--.

Signed and Sealed this

Twenty-seventh Day of August, 1996

Attest:

BRUCE LEHMAN

Attesting Officer    Commissioner of Patents and Trademarks